(12) United States Patent
Fukuda et al.

(10) Patent No.: US 11,281,891 B2
(45) Date of Patent: Mar. 22, 2022

(54) BIOLOGICAL-INFORMATION DETECTING DEVICE AND BIOLOGICAL-INFORMATION DETECTING METHOD

(71) Applicant: Hitachi, Ltd., Tokyo (JP)

(72) Inventors: Nobuhiro Fukuda, Tokyo (JP); Hironori Wakana, Tokyo (JP); Masuyoshi Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 122 days.

(21) Appl. No.: 16/656,762

(22) Filed: Oct. 18, 2019

(65) Prior Publication Data
US 2020/0134293 A1 Apr. 30, 2020

(30) Foreign Application Priority Data
Oct. 31, 2018 (JP) .............................. JP2018-205849

(51) Int. Cl.
*G06K 9/00* (2006.01)
*H04N 5/33* (2006.01)
(Continued)

(52) U.S. Cl.
CPC ......... *G06K 9/00275* (2013.01); *G01N 21/35* (2013.01); *G06K 9/00281* (2013.01);
(Continued)

(58) Field of Classification Search
CPC ........... G06K 9/00275; G06K 9/00281; G06K 9/6202; G06K 9/4652; G06K 9/6289;
(Continued)

(56) References Cited

U.S. PATENT DOCUMENTS

| 5,790,188 A * | 8/1998 | Sun ........................ G01J 3/2823 348/143 |
| 2009/0326383 A1* | 12/2009 | Barnes ................. H04N 5/2256 600/476 |

(Continued)

FOREIGN PATENT DOCUMENTS

JP 2018-086130 A 6/2018

OTHER PUBLICATIONS

NPL Dialog Search History (Year: 2021).*
(Continued)

*Primary Examiner* — Nancy Bitar
(74) *Attorney, Agent, or Firm* — Mattingly & Malur, PC

(57) ABSTRACT

A biological-information detection device includes a video input section accepting video signals including three wavelength components in an infrared region of reflected light from an object, a wavelength detecting section acquiring a wavelength and an intensity of the reflected light from the video signals, a face feature amount detecting section detecting a plurality of feature points of a face based on the video signals, a measurement target area identifying section identifying a measurement target area on a basis of the plurality of feature points of the face detected, a wavelength fluctuation detecting section detecting a difference between a wavelength of reflected light from the measurement target area at a certain point in time and a wavelength of reflected light at a point in time preceding the certain point in time, and a pulse wave detecting section detecting a change in the detected difference according to the point in time.

10 Claims, 12 Drawing Sheets

(51) Int. Cl.
*G06K 9/46* (2006.01)
*G06K 9/62* (2006.01)
*G01N 21/35* (2014.01)

(52) U.S. Cl.
CPC ......... *G06K 9/4652* (2013.01); *G06K 9/6202* (2013.01); *H04N 5/33* (2013.01)

(58) Field of Classification Search
CPC ....... G06K 2009/4657; G06K 9/00261; G01N 21/35; H04N 5/33; H04N 9/07; H04N 9/09; H04N 9/04557; H04N 9/04553; H04N 5/332
See application file for complete search history.

(56) References Cited

U.S. PATENT DOCUMENTS

2018/0068171 A1* 3/2018 Jones .................. A61B 5/00
2018/0150682 A1 5/2018 Fukuda et al.

OTHER PUBLICATIONS

Ming-Zher Poh et al., "Non-contact, automated cardiac pulse measurements using video imaging and blind source separation", Optics Express, vol. 18, No. 10, May 10, 2010, pp. 10762-10774.
Wim Verkruysse et al., "Remote plethysmographic imaging using ambient light.", Optics express, vol. 16. No. 26 Dec. 22, 2008, pp. 21434-21445.

* cited by examiner

BIOLOGICAL-INFORMATION DETECTING DEVICE AND BIOLOGICAL-INFORMATION DETECTING METHOD

CLAIM OF PRIORITY

The present application claims priority from Japanese patent application JP2018-205489 filed on Oct. 31, 2018, the content of which is hereby incorporated by reference into this application.

BACKGROUND OF THE INVENTION

1. Field of the Invention

The present invention relates to a technique for detecting biological information.

2. Description of the Related Art

As a method for acquiring biological information, a technique is available that allows real-time, non-contact detection using a microwave or a camera. In particular, for pulse detection using a camera, a camera module has been increasingly miniaturized and mounted in portable terminals including smartphones. Such a technique has been increasingly spreading.

As a technique for pulse detection using imaging, a method is available that includes tracing particularly a G signal included in an RGB signal in a face video to detect a pulse (Verkruysse, Wim, Lars O. Svaasand, J. Stuart Nelson, "Remote plethysmographic imaging using ambient light.", Optics express 16. 26 (2008): 21434-21445).

To use the RGB signal and separate noise, another available method uses independent component analysis to separate noise (Ming-Zher Poh, Daniel J. McDuff, Rosalind W. Picard, "Non-contact, automated cardiac pulse measurements using video imaging and blind source separation.", Optics Express 18. 10 (2010): 10762-10774). Another available method focuses on a difference in the amount of change among signal components of the RGB signal and separates color components of a face video into the wavelength and spectral intensity of reflected light to provide a detection method insusceptible to environmental changes (JP-2018-86130-A). The method is as described below. That is, the pulse wave receives pressure from the heart, and blood flow periodically varies in response to heart beat. Light absorbs hemoglobin in the blood, and thus displacement of the spectral intensity is observed on the basis of a video corresponding to the skin under constant external light. However, the spectral intensity varies according to fluctuation in external light, often leading to noise. Thus, JP-2018-86130-A discloses that light is converted into a wavelength component and that fluctuation in spectral wavelength is detected as a pulse wave.

SUMMARY OF THE INVENTION

The above-described technique is expected as a measurement method in which no load is imposed on a subject. In these circumstances, a technique for performing measurements in a non-contact manner from a remote position using a camera is important as a technique for monitoring a driver driving a vehicle or a sudden change in condition at home due to a respiratory disease, a heart failure, or the like.

A face video is formed by, for example, reflected light returning, while scattering, from the skin into which illumination light radiated to the face has been absorbed. Thus, the known method using the RGB signal corresponds to observation of variations in the spectral intensity of reflected light in three colors. Thus, in a case where the face is exposed to steady light, the pulse can be stably detected. However, detection is precluded during night-time or in a dark room. Thus, in a certain method, a near-infrared camera replaces a visible-light camera and radiates infrared light, and variations in infrared signal are measured instead of variations in RGB signal to detect the pulse wave. However, the infrared signal penetrates the skin deeper than the RGB signal and is thus susceptible to noise. Additionally, in an infrared region with no color information, identifying a skin area of the face is difficult.

In view of these problems, an aspect of the present invention is to detect the pulse wave by measuring variations in the wavelength of an infrared spectrum.

To accomplish the object, a typical aspect of the present invention provides a biological-information detection device including a video input section accepting video signals including three wavelength components in an infrared region included in reflected light from an object, a wavelength detecting section acquiring a wavelength and an intensity of the reflected light from the video signals, a face feature amount detecting section detecting a plurality of feature points of a face on a basis of the video signals, a measurement target area identifying section identifying a measurement target area on a basis of the plurality of feature points of the face detected, a wavelength fluctuation detecting section detecting a difference between a wavelength of reflected light from the measurement target area at a certain point in time and a wavelength of reflected light at a point in time preceding the certain point in time, and a pulse wave detecting section detecting, as a pulse wave, a change in the detected difference according to the point in time.

According to an aspect of the present invention, monitoring can be performed during night-time and the like in a non-contact manner.

The objects, configurations, and effects other than those described above will be apparent from the description of embodiments.

DESCRIPTION OF THE PREFERRED EMBODIMENTS

Figure 1:
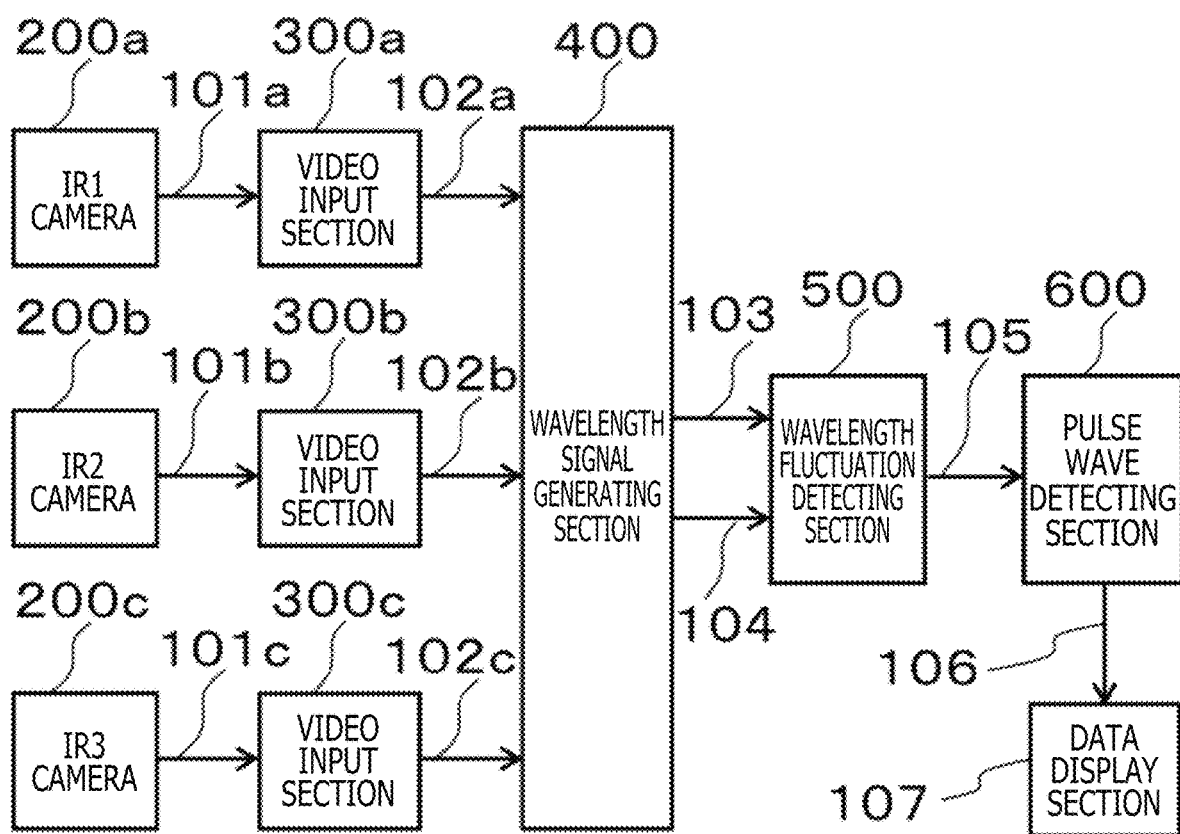
FIG. 1 is a block diagram illustrating an example of a configuration of a biological-information detecting device according to Embodiment 1.

Embodiments of the present invention will be described below on the basis of the drawings. However, the present invention is not limited to the embodiments. Note that, in the drawings illustrating the embodiments, the same members are denoted by the same reference signs, and repeated descriptions of the members are omitted.

Embodiment 1

In the present embodiment, an example of a biological-information detecting device will be described that functions to detect a pulse from a face video using an infrared (IR) light source and three cameras.

FIG. 1 is a block diagram illustrating an example of a configuration of a biological-information detecting device according to Embodiment 1.

The biological-information detecting device according to the present embodiment includes an IR1 to an IR3 cameras 200a to 200c that are a first to a third IR cameras, respectively, video input sections 300a to 300c, a wavelength signal generating section 400, a wavelength fluctuation detecting section 500, a pulse wave detecting section 600, and a data display section 107.

Infrared imaging data, that is, an IR1 imaging data signal 101a output from the IR1 camera 200a, is input to the video input section 300a. IR2 imaging data signal 101b output from the IR2 camera 200b is input to the video input section 300b. IR3 imaging data signal 101c output from the IR3 camera 200c is input to the video input section 300c. A delayed IR1 data signal 102a, a delayed IR2 data signal 102b, and a delayed IR3 data signal 102c output from the video input sections 300a to 300c, respectively, are input to the wavelength signal generating section 400. A wavelength data signal 103 and a level signal 104 output from the wavelength signal generating section 400 are input to the wavelength fluctuation detecting section 500. An average wavelength difference data signal 105 output from the wavelength fluctuation detecting section 500 is input to the pulse wave detecting section 600. A pulse signal 106 output from the pulse wave detecting section 600 is input to the data display section 107.

Figure 2:
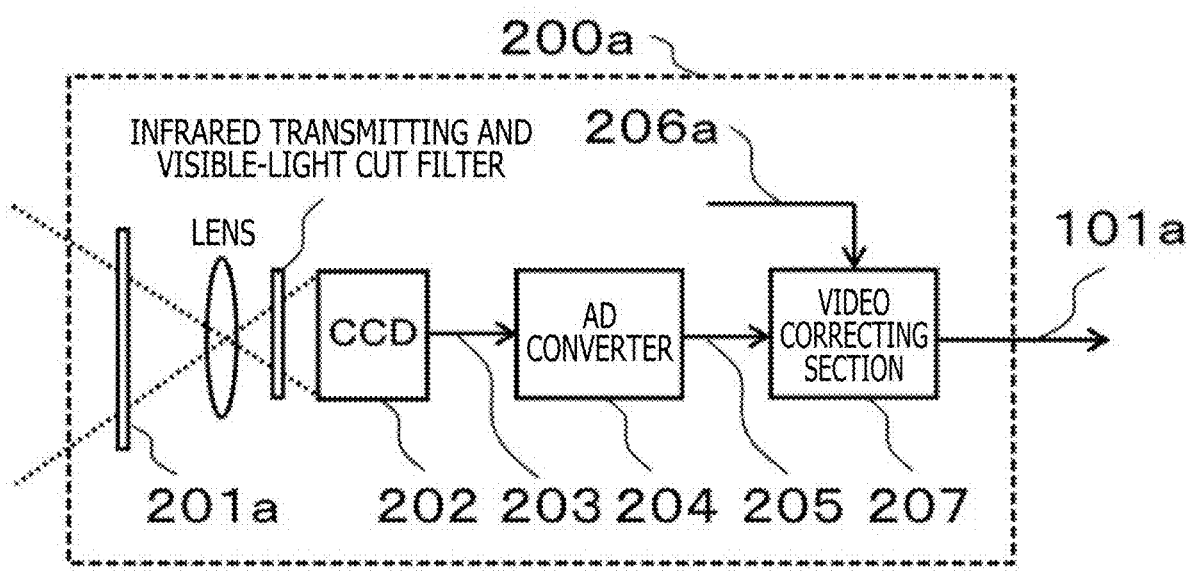
FIG. 2 is a diagram illustrating an example of an IR camera module of the biological-information detecting device according to Embodiment 1.

FIG. 2 is a diagram illustrating an example of an IR camera module of the biological-information detecting device according to Embodiment 1.

In the IR1 camera 200a, a charge-coupled device (CCD) 202 is irradiated with infrared light through an IR1 transmitting filter 1 (band-pass filter or low pass filter) 201a installed for a lens. The band of the IR1 transmitting filter 201a installed at the lens is included in the band of an infrared transmitting and visible-light cut filter mounted in the camera. The light is photoelectrically converted into an electric signal 203 which is then digitized by an analog-to-digital (AD) converter 204. A resultant digital data signal 205 is input to a video correcting section 207.

The video correcting section 207 performs video adjustment such as white balancing and contrasting using a video adjustment parameter 206a, and outputs IR1 imaging data signal 101a including an IR wavelength for each pixel as a component.

The IR2 camera 200b and the IR3 camera 200c are configured similarly to the IR1 camera 200a except that the IR transmitting filter installed at a lens in each of the IR2 and IR3 cameras 200b and 200c is a band-pass filter or a low pass filter having a wavelength different from the band of the IR1 transmitting filter 201a. In the description of the present configuration, the IR1 transmitting filter 201a is installed at the lens. However, the IR1 transmitting filter 201a may be replaced with a mounted infrared transmitting and visible-light cut filter and may be installed between the lens and the CCD. The CCD camera has been described by way of example. However, the CCD 202 is an example of a light receiving section (image sensor), and each of the IR1 to IR3 cameras 200a to 200c may include a light receiving section other than the CCD (for example, indium gallium arsenide (InGaAs)).

The biological-information detecting device according to the present embodiment includes three cameras. However, video adjustment parameters 206a, 206b, and 206c respectively provided in the IR1 camera 200a, the IR2 camera 200b, and the IR3 camera 200c may be the same or different as long as the IR1 camera 200a includes the infrared transmitting visible-light filter 201a, the IR2 camera 200b includes an infrared transmitting visible-light filter (not illustrated) different from that of the IR1 camera, and the IR3 camera 200c includes an infrared transmitting visible-light filter (not illustrated) different from those of the IR1 and IR2 cameras. All the IR cameras are the same in the remaining part of the configuration, and thus, illustration of detailed configurations of the IR2 camera 200b and the IR3 camera 200c is omitted.

Figure 16:
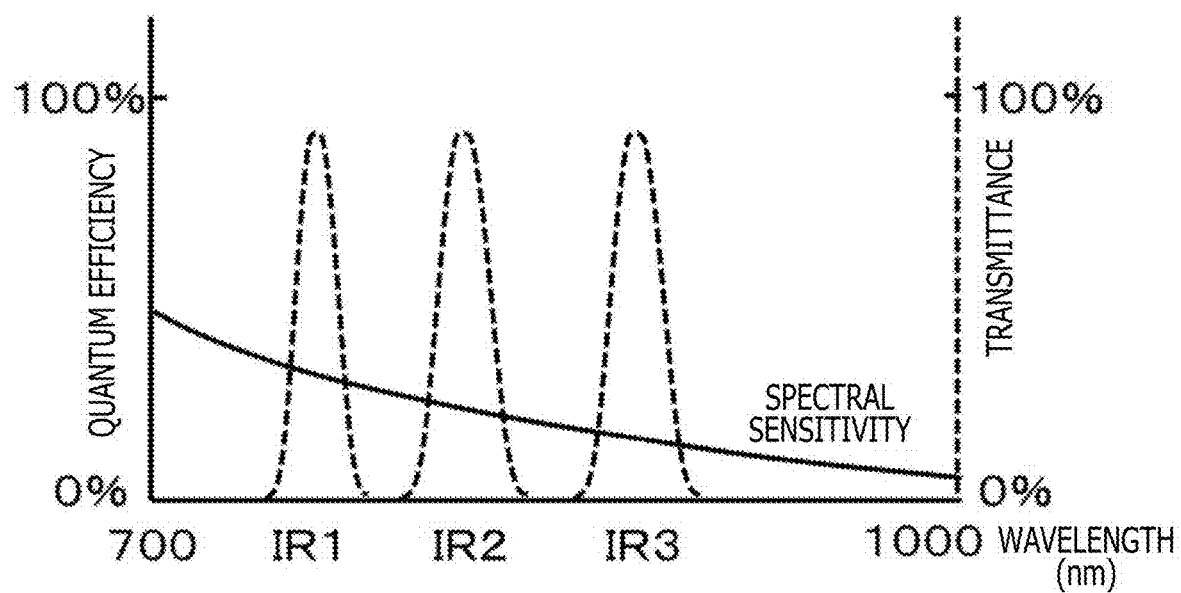
FIG. 16 is a diagram illustrating an example of spectral sensitivities of IR cameras and transmittances of filters, the IR cameras and the filters being used in the biological-information detecting device according to Embodiment 1.

FIG. 16 is a diagram illustrating an example of spectral sensitivities of the IR cameras and transmittances of the filters, the IR cameras and the filters being used in the biological-information detecting device according to Embodiment 1.

The wavelength on the horizontal axis corresponds to near infrared rays and ranges from 700 to 1,000 nm, a solid graph indicates the spectral sensitivity of the CCD, and the ordinate axis indicates a quantum efficiency. Additionally, dashed graphs indicate characteristic curves of three types of band-pass filters, with the transmittance of the filter indicated on the ordinate axis. FIG. 16 illustrates IR1, IR2, and IR3 in order of increasing wavelength. However, the order and the bandwidths may be changed and a low pass filter may be used.

Additionally, the IR1 camera, the IR2 camera, and the IR3 camera need to capture an image of the same subject, and thus, the three cameras may be arranged in juxtaposition and videos may be geometrically corrected to the same position. Alternatively, correction may be made to allow images to be captured at optically the same position.

Figure 7A:
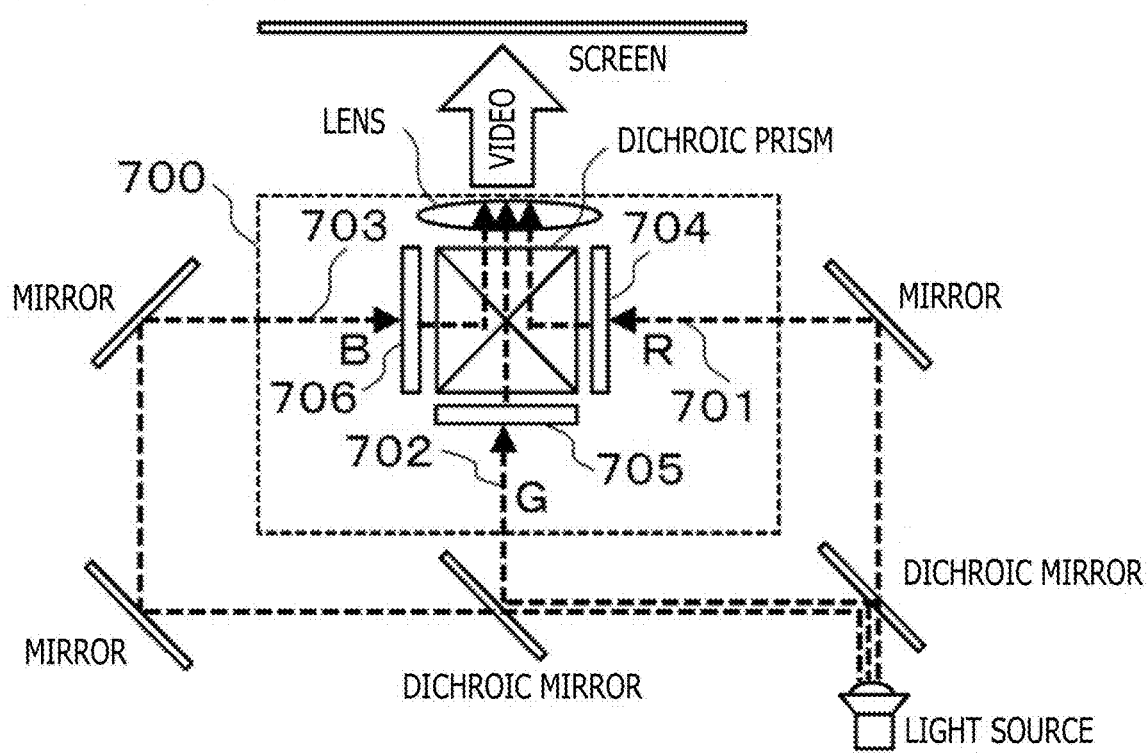
FIG. 7A is a diagram illustrating a 3LCD system that is an optical system in a projector, as an example of an optical system related to the biological-information detecting device according to Embodiment 1.

FIG. 7A is a diagram illustrating a 3 liquid crystal display (LCD) method that is one of optical systems in projectors, as an example of an optical system according to the biological-information detecting device according to Embodiment 1.

A light ray output from a light source is split into a red wavelength R701, a green wavelength G702, and a blue wavelength B703 which are input to a 3LCD optical system 700. In the optical system 700, light rays respectively pass through a red LCD 704, a green LCD 705, and a blue LCD 706 to generate a video with an R component, a video with a G component, and a video with a B component. The light rays constituting the videos are transmitted and reflected by dichroic prisms as illustrated in FIG. 7A to provide a synthesized video. The video passes through a lens and is formed into a video on a screen.

Figure 7B:
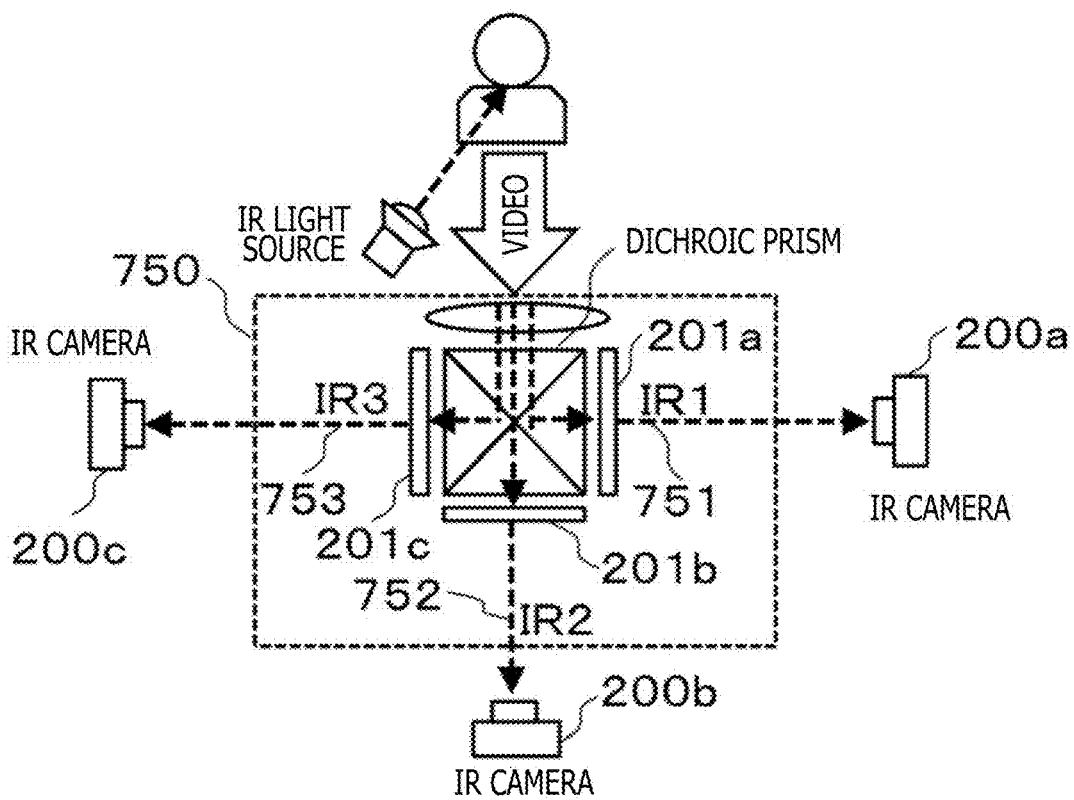
FIG. 7B is a diagram illustrating an example of an optical system in the biological-information detecting device according to Embodiment 1.

FIG. 7B is a diagram illustrating an example of an optical system in the biological-information detecting device according to Embodiment 1.

Specifically, FIG. 7B illustrates a method for acquiring a video by tracking an optical path opposite to the optical path in the 3LCD method illustrated in FIG. 7A. As illustrated in an optical system 750 in FIG. 7B, a video is converted into an R component, a G component, and a B component through a lens and dispersed through dichroic prisms that transmit and reflect IR1 (751), IR2 (752), and IR3 (753). Resultant light rays pass through the IR1 transmitting filter 201a, the IR2 transmitting filter 201b, and the IR3 transmitting filter 201c to the IR cameras 200a, 200b, and 200c in which the light rays are converted into videos with the respective components. Additionally, with an external light source such as an incandescent lamp, infrared rays emitted from the light source may be utilized. With no light source, infrared light including infrared wavelengths IR1, IR2, and IR3 may be separately prepared.

Figure 3:
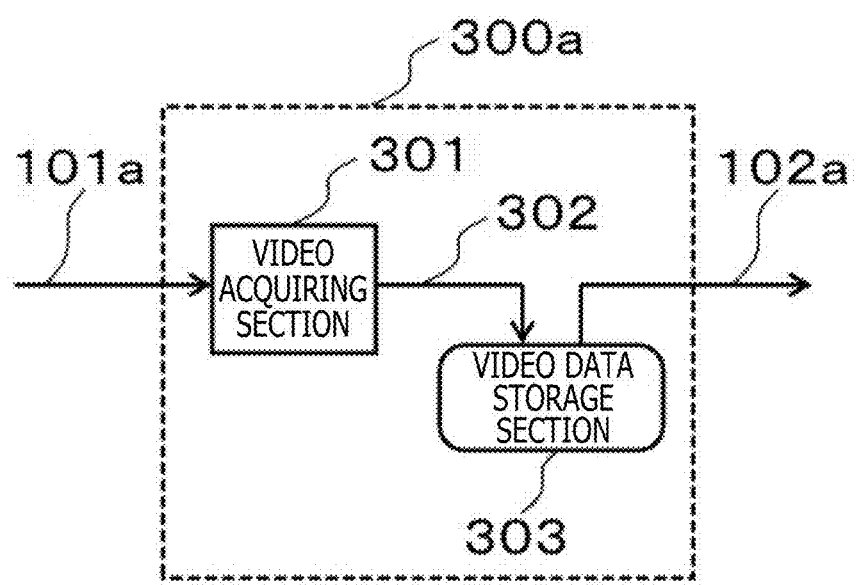
FIG. 3 is a diagram illustrating an example of a video input section of the biological-information detecting device according to Embodiment 1.

FIG. 3 is a diagram illustrating an example of the video input section of the biological-information detecting device according to Embodiment 1.

The video input section 300a includes a video acquiring section 301 and a video data storage section 303. The video acquiring section 301 receives the IR1 imaging data signal 101a as an input signal and outputs an IR data signal 302 for a video. The video data storage section 303 receives the IR data signal 302 for one frame as an input signal and outputs the delayed IR1 data signal 102a. The video input section 300b and the video input section 300c are configured similarly to the video input section 300a, and thus, illustration of the video input sections 300b and 300c is omitted.

Figure 4A:
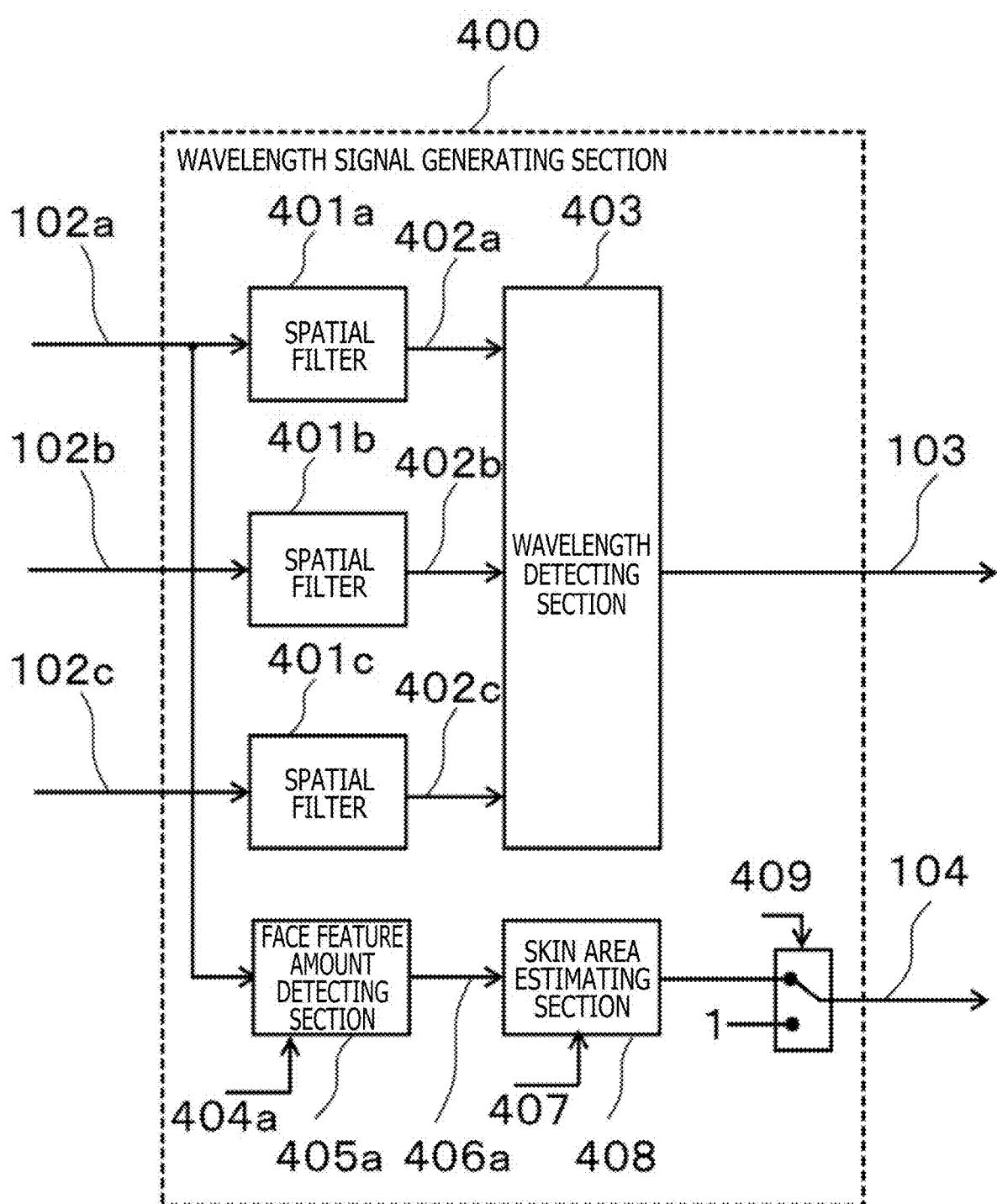
FIG. 4A is a diagram illustrating an example of a wavelength signal generating section of the biological-information detecting device according to Embodiment 1.

FIG. 4A is a diagram illustrating an example of the wavelength signal generating section 400 of the biological-information detecting device according to Embodiment 1.

The wavelength signal generating section 400 includes spatial filters 401a, 401b, and 401c, a wavelength detecting section 403, a face feature amount detecting section 405a, a skin area estimating section 408, and a switch 409. The wavelength signal generating section 400 executes video processing for each pixel.

The spatial filters 401a, 401b, and 401c receive, as input signals, the delayed IR1 data signal 102a, the delayed IR2 data signal 102b, and the delayed IR3 data signal 102c, respectively, each including a line delay corresponding to taps of a convolution kernel. For example, the spatial filters 401a, 401b, and 401c perform weighted averaging on pixels around a pixel of interest and outputs a smoothed delayed IR1 data signal 402a, a smoothed delayed IR2 data signal 402b, and a smoothed delayed IR3 data signal 402c.

The wavelength detecting section 403 receives, as input signals, the smoothed delayed IR1 data signal 402a, the smoothed delayed IR2 data signal 402b, and the smoothed delayed IR3 data signal 402c, and converts the data signals into the wavelength data signal 103.

The face feature amount detecting section 405a, for example, receives, as an input signal, the delayed IR1 data signal 102a, one of the delayed IR data signals, and adjusts the sharpness, contrast, and noise of the IR video according to the wavelength of the IR1 transmitting filter 201a provided in the IR1 camera 200a, on the basis of an IR1 video adjustment parameter 404a. The face feature amount detecting section 405a outputs an IR1 face feature amount 406a such as the coordinates and sizes of the eyes, the mouth, and the nose.

The skin area estimating section 408 functions to identify a measurement target area for the biological-information detecting device. Specifically, the skin area estimating section 408 receives the IR1 face feature amount 406a as an input signal and estimates a skin area used for pulse wave detection, for example, on the basis of position offsets set in accordance with a skin area estimating section parameter 407. The skin area estimating section 408 outputs the level signal 104 indicating the skin area. A switch 409 enables or disables the skin area estimating function in a switchable manner. In the present embodiment, the thus estimated skin area is identified as a measurement target area.

In this case, the wavelength detecting section 403 may set the smoothed delayed IR1 data signal 402a, the smoothed delayed IR2 data signal 402b, and the smoothed delayed IR3 data signal 402c, for example, as R, G, and B and use an RGB-HSV conversion. The wavelength detecting section 403 may output H (Hue) as the wavelength data signal 103.

Figure 13:
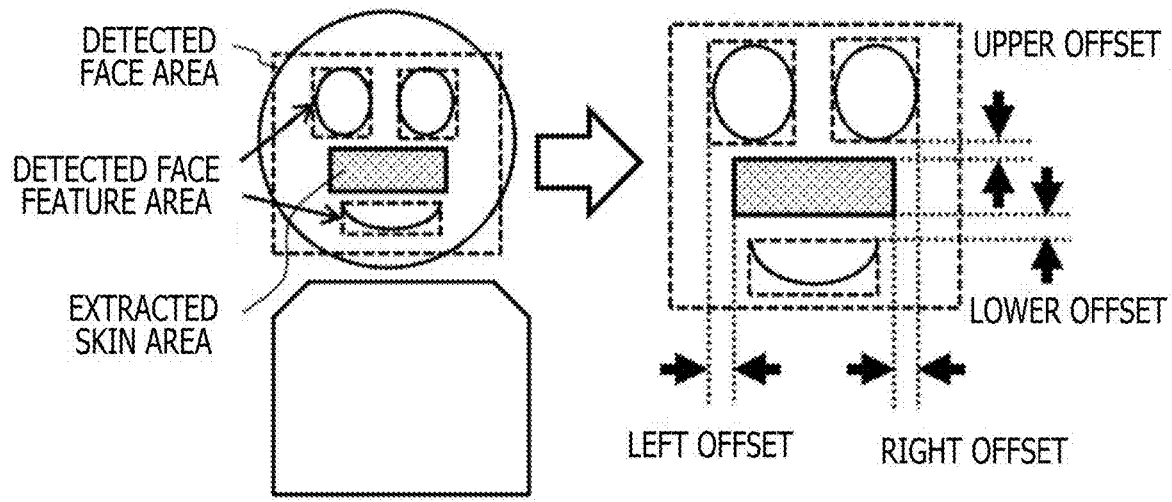
FIG. 13 is a diagram illustrating an example of a skin area detected by a face feature amount detecting section of the biological-information detecting device according to Embodiment 1.

FIG. 13 is a diagram illustrating an example of the skin area detected by the face feature amount detecting section 405a of the biological-information detecting device according to Embodiment 1.

Examples of feature parts constituting the face include the eyes, the mouth, the nose, the eyebrows, and the ears. The eyes and the mouth are used in the description of the present embodiment.

For example, the face feature amounts of the eyes and the mouth can be identified using a feature classifier such as Haar-like or a local binary pattern (LBP) as is the case with detected face feature areas in FIG. 13, and can be calculated, for example, as rectangular areas. Pulse wave detection in the present embodiment utilizes changes in the color of the skin and thus needs detection of skin areas. Thus, the face feature amount detecting section 405a estimates, as a skin area of the face, a rectangle located at an upper, a lower, a left, and a right offset distances in FIG. 13, for example, from the rectangular positions of the eyes and the mouth.

In this case, the skin area needs to be located inside the face, and thus, the face feature amount detecting section 405a performs face detection and determines whether the skin area is included in the rectangle of the detected face. In a case where the skin area is not included in the rectangle, the face feature amount detecting section 405a invalidates the skin area by, for example, setting the size of the skin area to zero.

As described above, the skin area is estimated on the basis of the features of the face such as the eyes and the mouth to allow the measurement target area to be identified on the basis of signals in the infrared region with no color information. Additionally, appropriate adjustment of the offsets allows the accuracy of estimation of the skin area to be improved.

Figure 4B:
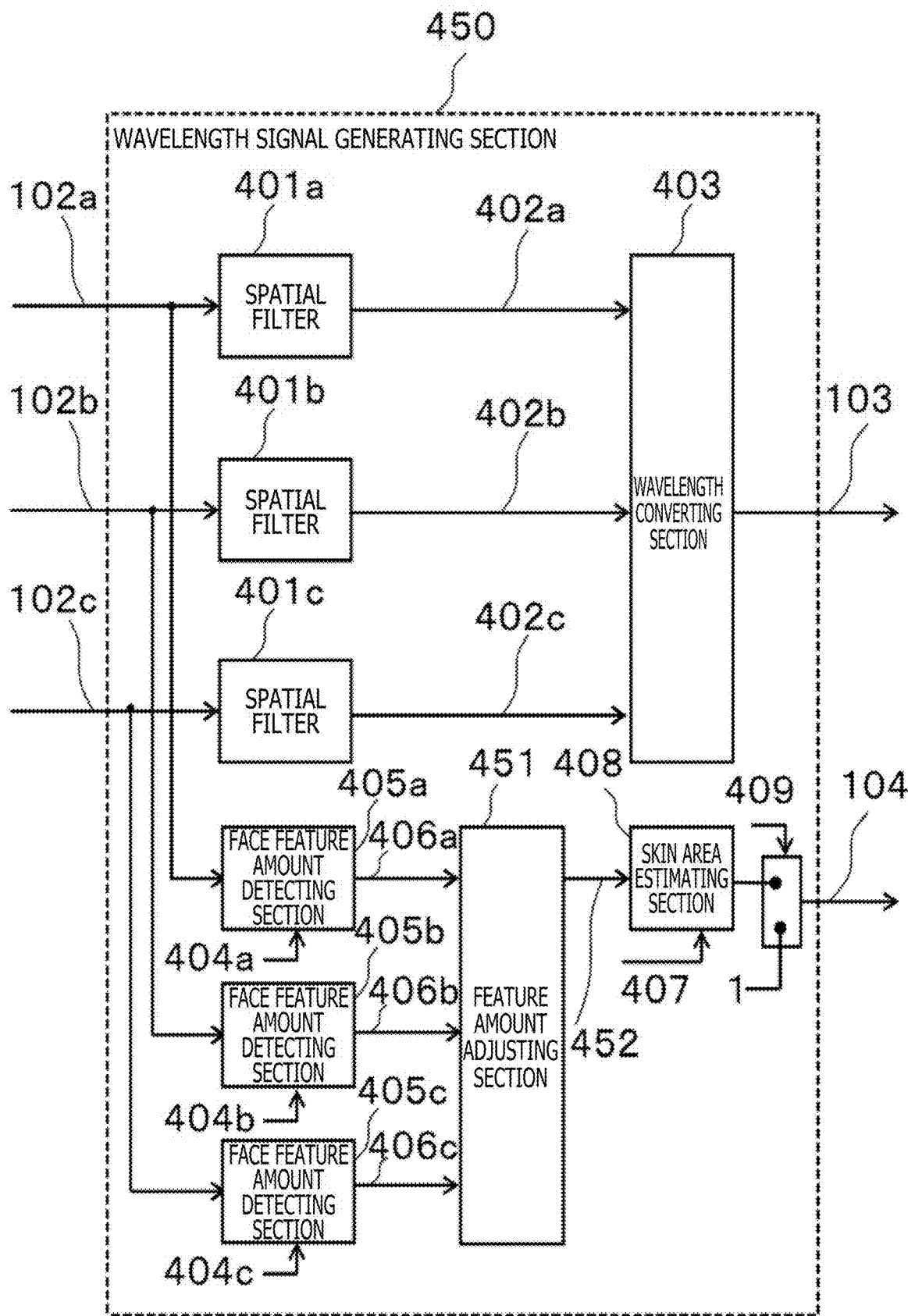
FIG. 4B is a diagram illustrating an example of a wavelength signal generating section of the biological-information detecting device according to Embodiment 1, the wavelength signal generating section including a plurality of face feature amount detecting sections.

FIG. 4B is a diagram illustrating an example of the wavelength signal generating section of the biological-information detecting device according to Embodiment 1, the wavelength signal generating section including a plurality of face feature amount detecting sections 405a to 405c.

In FIG. 1, the wavelength signal generating section 400 may be replaced with a wavelength signal generating section 450 illustrated in FIG. 4B. The wavelength signal generating section 450 includes the spatial filters 401a, 401b, and 401c, the wavelength detecting section 403, the face feature amount detecting sections 405a, 405b, and 405c, the feature amount adjusting section 451, the skin area estimating section 408, and the switch 409.

The spatial filters 401a, 401b, and 401c receive, as input signals, the delayed IR1 data signal 102a, the delayed IR2 data signal 102b, the delayed IR3 data signal 102c, and outputs the smoothed delayed IR1 data signal 402a, the smoothed delayed IR2 data signal 402b, and the smoothed delayed IR3 data signal 402c. The wavelength detecting section 403 receives, as input signals, the smoothed delayed IR1 data signal 402a, the smoothed delayed IR2 data signal 402b, and the smoothed delayed IR3 data signal 402c, and converts the data signals into the wavelength data signal 103.

Additionally, the face feature amount detecting section 405a receives the delayed IR1 data signal 102a and the IR1 video adjustment parameter 404a as input signals, and outputs the IR1 face feature amount 406a. The face feature amount detecting section 405b receives the delayed IR2 data signal 102b and the IR2 video adjustment parameter 404b as input signals, and outputs an IR2 face feature amount 406b. The face feature amount detecting section 405c receives the delayed IR3 data signal 102c and the IR3 video adjustment parameter 404c as input signals, and outputs an IR3 face feature amount 406c.

The feature amount adjusting section 451 receives the IR1 face feature amount 406a, the IR2 face feature amount 406b, and the IR3 face feature amount 406c as input signals, and averages the input signals, that is, numerical values such as coordinates and sizes. The feature amount adjusting section 451 outputs an adjusted face feature amount 452.

The skin area estimating section 408 estimates the skin area used for pulse wave detection, for example, on the basis of position offsets set in accordance with the skin area estimating section parameter 407, and outputs the level signal 104 indicating the skin area. The switch 409 enables or disables the skin area estimating function in a switchable manner.

In this case, the calculation by the feature amount adjusting section 451 is, for example, the calculation of the average value of the IR face feature amounts, but may be calculation of an intermediate value. Additionally, in a case where any face feature amount fails to be detected, the feature amount may be excluded from the calculation or data output of the adjusted face feature amount may be omitted or the adjusted face feature amount may be set to zero.

When signals with three infrared wavelengths are acquired as described above, any of the signals may fail to be used due to the effect of noise or the like. In such a case, the effect of noise included in the infrared signal can be reduced by excluding the unusable signal, detecting the face feature amounts in usable signals, and estimating the skin area on the basis of the average value, intermediate value, or the like of the detected face feature amounts.

As described above, the wavelength signal generating section 400 illustrated in FIG. 4A or the wavelength signal generating section 450 illustrated in FIG. 4B can convert displacement of the spectral intensity into displacement of the wavelength.

Figure 12:
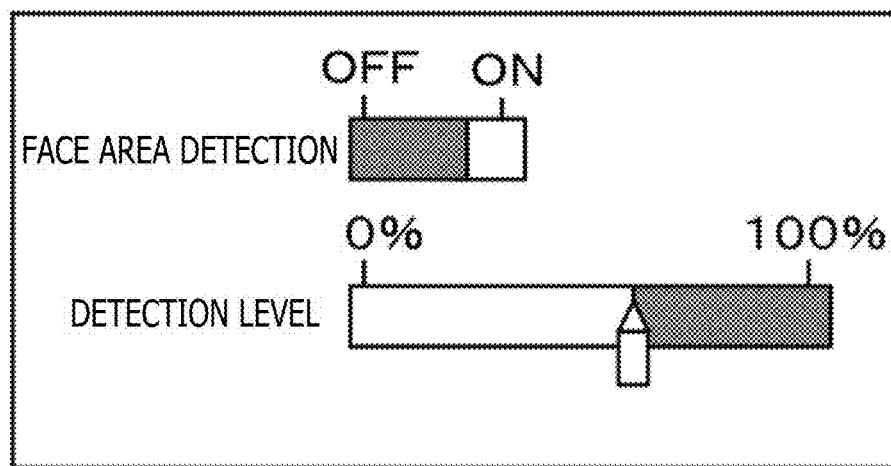
FIG. 12 is a diagram illustrating an example of a method for adjusting the level of face area detection according to Embodiment 1.

FIG. 12 is a diagram illustrating an example of a method for adjusting the level of face area detection according to Embodiment 1.

A face area detection switch is operatively associated with the switch 409 which enables or disables the skin area estimating function in a switchable manner. The wavelength signal generating section 400 or 450 may output a signal from the skin area estimating section 408 as the level signal 104 indicating the skin area when the face area detection switch is on, and may select the entire area as the skin area when the face area detection switch is off. For example, assume that the skin area in the video is 1 and any other area in the video is 0, the level signal 104 indicating the skin area may be forced to be 1 regardless of the output from the skin area estimating section 408 in a case where the face area detection switch is off.

Figure 5:
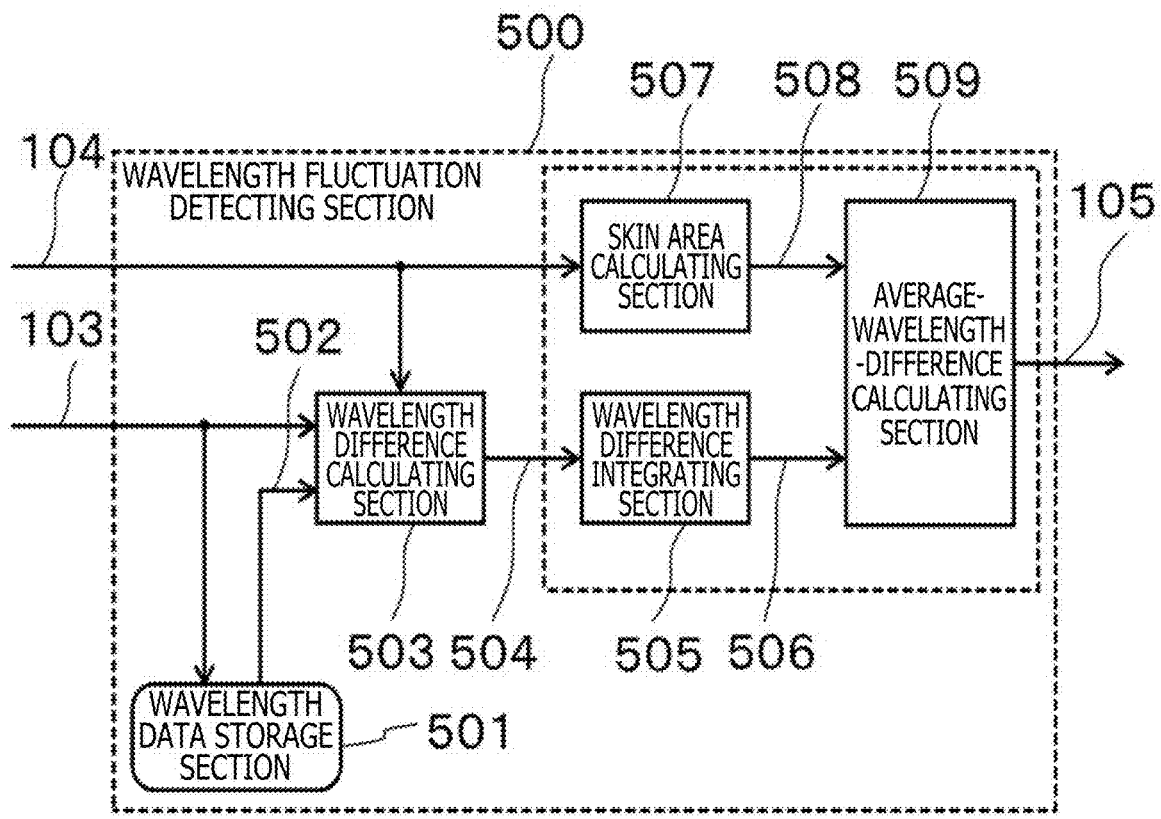
FIG. 5 is a diagram illustrating an example of a wavelength fluctuation detecting section of the biological-information detecting device according to Embodiment 1.

FIG. 5 is a diagram illustrating an example of the wavelength fluctuation detecting section 500 of the biological-information detecting device according to Embodiment 1.

The wavelength fluctuation detecting section 500 includes a wavelength data storage section 501, a wavelength difference calculating section 503, a wavelength difference integrating section 505, a skin area calculating section 507, and an average-wavelength-difference calculating section 509. The wavelength data storage section 501 stores the wavelength data signal 103 for each frame and outputs a delayed wavelength data signal 502 resulting from frame delay.

The wavelength difference calculating section 503 receives, as input, the level signal 104 indicating the skin area, the wavelength data signal 103, and the delayed wavelength data signal 502. In a case where a signal for pixels in the skin area is input to the wavelength difference calculating section 503 (that is, 1 is input as the level signal 104), the wavelength difference calculating section 503 outputs a wavelength difference data signal 504 calculated from the input wavelength data signal 103 and delayed wavelength data signal 502 (that is, the wavelength difference data signal 504 is a difference between the wavelength data signal 103 at a certain point in time and the wavelength data signal 103 at a point in time preceding the certain point in time). In a case where a signal for pixels other than the pixels in the skin area is input to the wavelength difference calculating section 503, the wavelength difference calculating section 503 outputs a 0 value.

The wavelength difference integrating section 505 receives, as input, the wavelength difference data signal 504 for the pixels in the skin area, integrates wavelength differences for respective frames, and outputs an integrated wavelength difference data signal 506. The skin area calculating section 507 receives, as input, the level signal 104 indicating the skin area, counts the number of the pixels in the skin area for each frame, and outputs a skin area signal 508. The average-wavelength-difference calculating section 509 receives, as input, the integrated wavelength difference data signal 506 and skin area signal 508 for the skin area pixels, calculates the wavelength difference for each frame, and outputs the average wavelength difference data signal 105.

Figure 6:
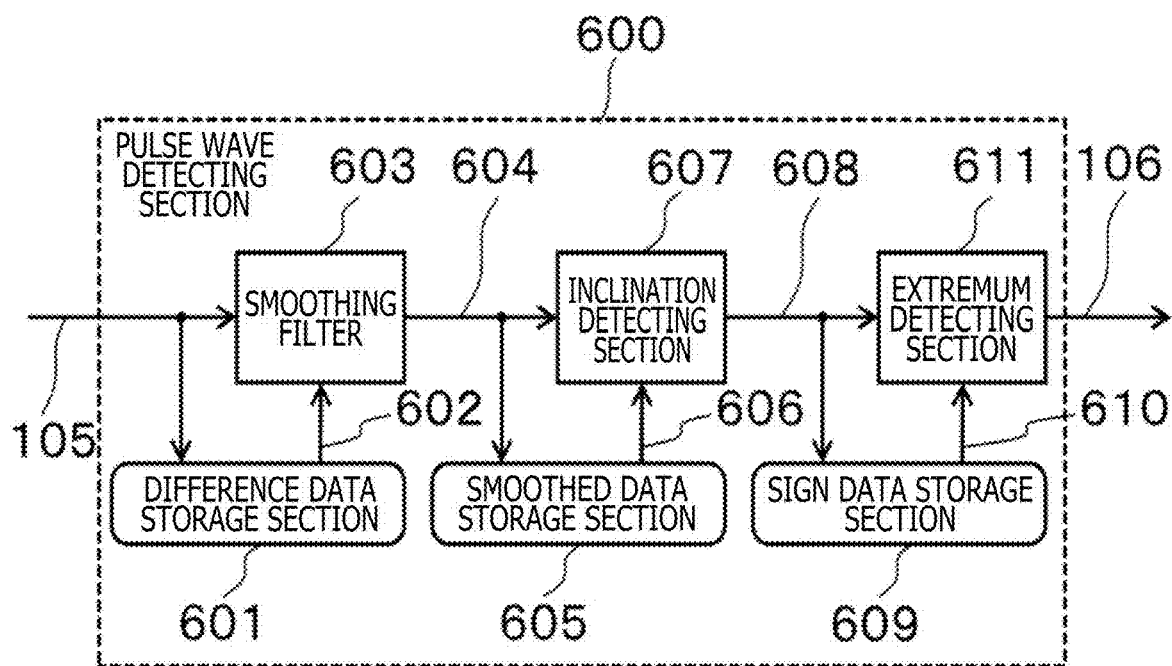
FIG. 6 is a diagram illustrating an example of a pulse wave detecting section of the biological-information detecting device according to Embodiment 1.

FIG. 6 is a diagram illustrating an example of the pulse wave detecting section 600 of the biological-information detecting device according to Embodiment 1.

The pulse wave detecting section 600 includes a difference data storage section 601, a smoothing filter 603, a smoothed data storage section 605, an inclination detecting section 607, a sign data storage section 609, and an extremum detecting section 611, and executes video processing for each frame.

The difference data storage section 601 receives the average wavelength difference data signal 105 as input and outputs a delayed wavelength difference data signal 602. The smoothing filter 603 receives the average wavelength difference data signal 105 and the delayed wavelength difference data signal 602 as input and outputs a wavelength difference data signal 604 resulting from smoothing, on a continuous time axis, of wavelength data for a plurality of frames.

The smoothed data storage section 605 receives the smoothed wavelength difference data signal 604 as input, holds wavelength difference data for a plurality of frames, and outputs a smoothed delayed wavelength difference data signal 606. The inclination detecting section 607 determines a difference between two consecutive frame data or between average frames among several consecutive neighbor frames, and outputs a sign data signal 608 indicating the sign of an inclination.

The sign data storage section 609 receives the sign data signal 608 as input, holds sign data for a plurality of frames, and outputs a delayed sign data signal 610. The extremum detecting section 611 receives the sign data signal 608 and the delayed sign data signal 610 as input, and determines extremums by setting, as a maximal value, a frame having an inclination with a sign having changed from a positive value to a negative value and setting, as a minimal value, a frame having an inclination with a sign having changed from a negative value to a positive value. The extremum detecting section 611 outputs, for example, the maximal value as a pulse signal 106.

Figure 8:
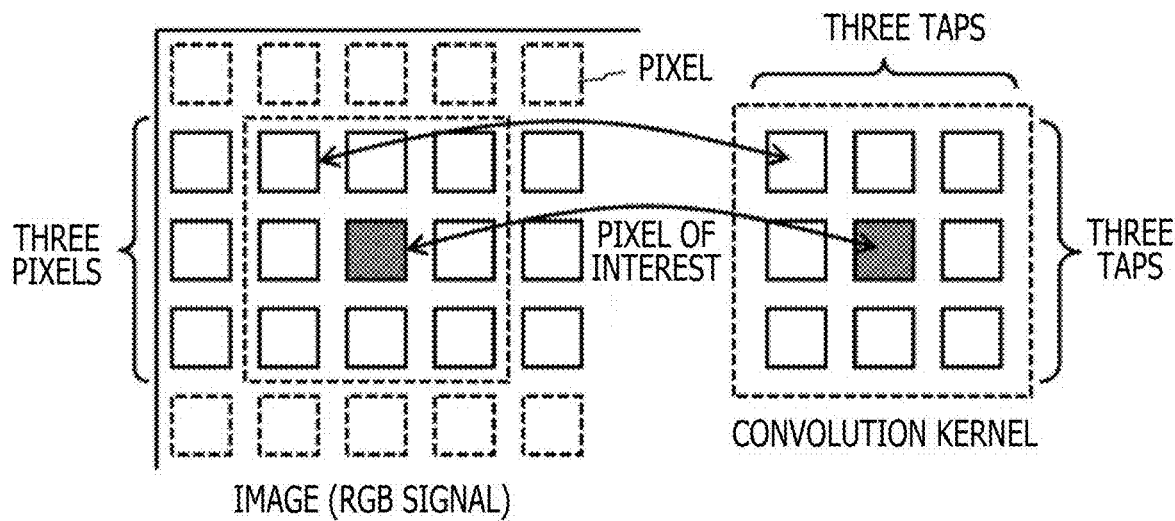
FIG. 8 is a diagram illustrating an example of a spatial filter according to Embodiment 1.

FIG. 8 is a diagram illustrating an example of a spatial filter according to Embodiment 1.

FIG. 8 is an example in which a matrix of 3×3 taps, that is, a 3×3 convolution kernel is applied to an image. Values obtained by performing a convolution operation on the kernel around a pixel of interest in the image are the smoothed delayed IR1 data signal 402a, the smoothed delayed IR2 data signal 402b, and the smoothed delayed IR3 data signal 402c. Values in the kernel are weighted average coefficients, and the sum of the values may be 1.0. For example, a mean value distribution, a Gaussian distribution, or the like can be used for smoothing.

Figure 9:
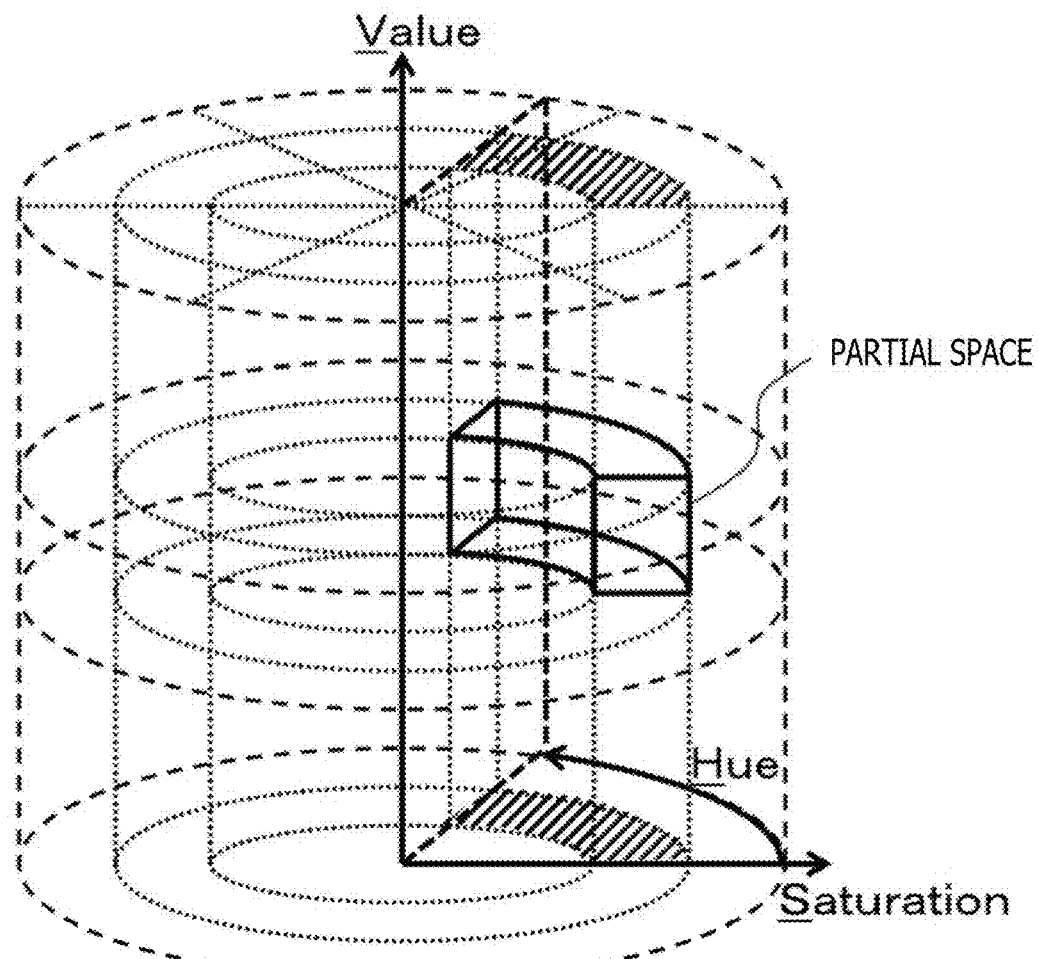
FIG. 9 is a diagram illustrating specified ranges of an HSV color space and a partial color space according to Embodiment 1.

FIG. 9 is a diagram illustrating an example of specified ranges of an HSV color space and a partial color space according to Embodiment 1.

FIG. 9 expresses the HSV color space in cylindrical coordinates. The vertical axis corresponds to Value, that is, brightness, and indicates the lightness of colors. The axis in the radial direction corresponds to Saturation and indicates the density of colors. The rotation angle corresponds to Hue. The hue is independent of intensity and density, and is considered to correspond to a wavelength component of reflected light given that imaging captures reflection of light. Similarly, the brightness can be considered to indicate the intensity of a particular wavelength.

The color space for the visible light region has been described. However, the visible light region is replaced with the infrared region for the biological-information detecting device of the present embodiment. For example, R, G, and B in the color space may be respectively replaced with IR1, IR2, and IR3, and an RGB-HSV conversion may be used to convert the IR space into the HSV space. The HSV space is used in the above description. However, a hue-saturation-lightness (HSL) space may be used or any other color space may be used as long as the space allows conversions into components similar to wavelength components.

Figure 11A:
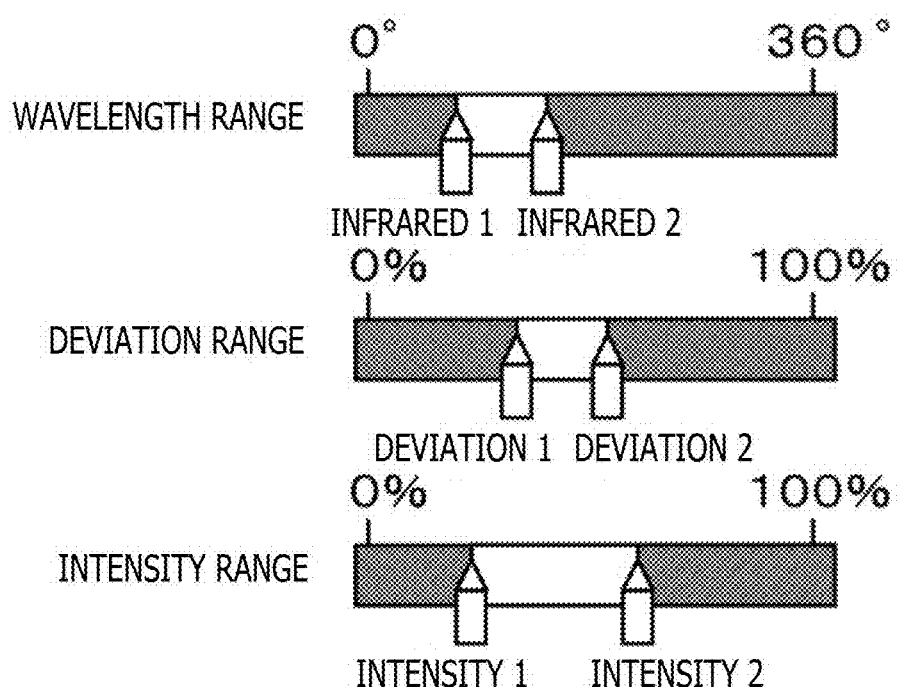
FIG. 11A is a diagram illustrating an example of a method for setting a partial color space according to Embodiment 1.

FIG. 11A is a diagram illustrating an example of a method for setting the partial color space according to Embodiment 1.

For example, the data display section 107 of the biological-information detecting device may display bars and icons; as illustrated in FIG. 11A, the bars indicate the entire ranges of the wavelength, deviation, and intensity, and the icons indicate both ends (for example, "Infrared 1" and "Infrared 2" specifying the wavelength range) of the range specified on each of the bars. Here, the wavelength, the deviation, and the intensity respectively correspond to the hue, the saturation, and the brightness in the color space for the infrared region. The user can specify the range by using an input device (not illustrated) of the biological-information detecting device to operate the corresponding icons.

For example, for the wavelength range, an angle of 0 degrees=360 degrees in the wavelength space corresponds to IR1, and angles of 120 degrees and 240 degrees in the wavelength space respectively correspond to IR2 and IR3. For example, the range may be specified as a section defined using Infrared 1 and Infrared 2. For the deviation range, 0% corresponds to even infrared rays, and 100% corresponds to the maximum deviation of infrared rays. For example, the range may be specified to lie from Deviation 1 to Deviation 2. The intensity ranges from 0% to 100%, and the range may similarly be specified to lie from Intensity 1 to Intensity 2.

Note that the wavelength range, the deviation range, and the intensity range may be manually set as illustrated in FIG. 11A but may be automatically set. Now, an example of a method for automatic setting will be described.

For example, the skin area estimating section 408 estimates the skin area as illustrated in FIG. 13 on the basis of the face feature amount detected by at least one of the face feature amount detecting sections 405a to 405c. Subsequently, the skin area estimating section 408 may set the wavelength range, the deviation range, and the intensity range such that the wavelength range, the deviation range, and the intensity range include the wavelengths, deviations, and intensities of at least some of the pixels in the skin area estimated on the basis of the face feature amount. For example, on the basis of appearance frequency distributions of the wavelength, deviation, and intensity values of the pixels in the skin area, the skin area estimating section 408 may set, as the wavelength range, the deviation range, and the intensity range, the ranges of the wavelength, deviation, and intensity in which the appearance frequency is higher than a predetermined value.

Subsequently, the skin area estimating section 408 estimates the skin area on the basis of a partial space (see FIG. 9) identified by the set wavelength range, deviation range, and intensity range. For example, the skin area estimating section 408 may finally estimate, as a skin area, that area of the pixels in the skin area estimated on the basis of the face feature amount in which the wavelength, deviation, and intensity values are respectively included in the above-described wavelength range, deviation range, and intensity range. Alternatively, the skin area estimating section 408 estimate, as a skin area, that area of the pixels in which the wavelength, deviation, and intensity values are respectively included in the above-described wavelength range, deviation range, and intensity range, regardless of the skin area estimated on the basis of the face feature amount.

In the present embodiment, the skin area can be estimated by utilizing the face feature amount. However, the position of the actual skin area may be moved, for example, the subject may change the posture as the time elapses. As a result, the estimated skin area includes an area other than the skin area, for example, the eyes or the mouth, which may lower the accuracy of detection of the pulse wave. In order to follow movement of the actual skin area, the face feature amount may constantly be detected, and on the basis of the face feature amount, the skin area may be estimated. However, detection of the face feature amount requires high calculation costs.

In contrast, the wavelength, deviation, and intensity values of pixels in the area other than the skin area such as the eyes and the mouth are expected to be out of the wavelength range, the deviation range, and the intensity range set as described above. Additionally, estimation of the skin area based on the partial space requires low calculation costs. Thus, the combination of estimations based on the partial space as described above enables the pulse wave to be accurately detected using a small amount of calculation while eliminating noise attributed to the area other than the skin area.

Figure 11B:
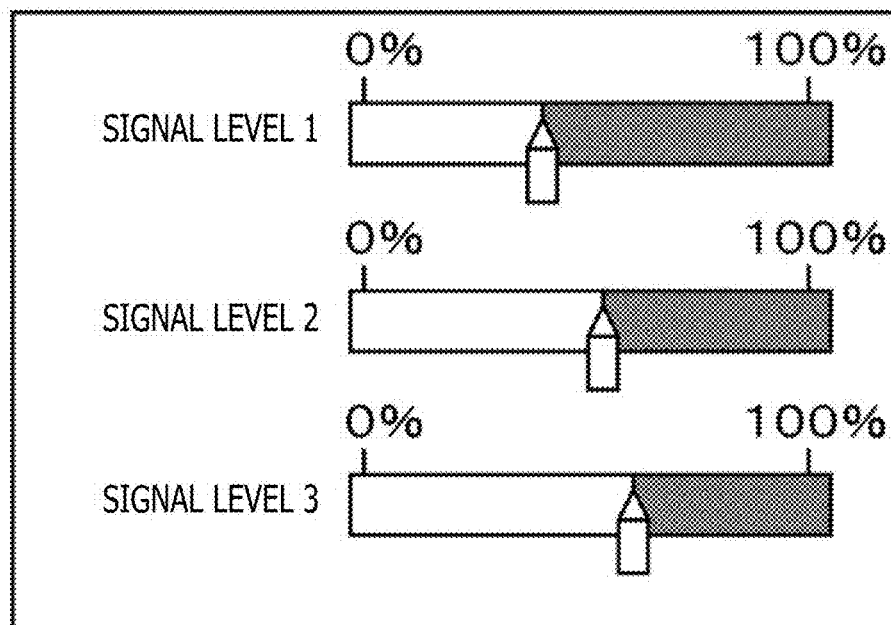
FIG. 11B is a diagram illustrating an example of a method for adjusting the level of an IR camera signal according to Embodiment 1.

FIG. 11B is a diagram illustrating an example of a method for adjusting the level of an IR camera signal according to Embodiment 1.

For example, the data display section 107 of the biological-information detecting device may display bars and icons; as illustrated in FIG. 11B, the bars indicate the entire ranges (from 0% to 100%) of a signal level 1, a signal level 2, and a signal level 3, and each of the icons indicates a signal level on the corresponding bar. In this case, the signal level 1 corresponds to the video adjustment parameter 206a set for the IR1 camera 200a. Similarly, the signal level 2 and the signal level 3 correspond to the video adjustment parameters (not illustrated) set for the IR2 camera 200b and the IR3 camera 200c. By using the input device (not illustrated) of the biological-information detecting device to operate the icons, the user can adjust the output from the wavelength detecting section 403.

The above-described configuration enables monitoring that suppresses the negative effect of noise in a non-contact manner and that detects, even during nighttime, a sudden change in condition due to a disease, a heart failure, or the like.

Embodiment 2

In Embodiment 1, the technique has been described that uses the IR light source and the three cameras to suppress the negative effect of noise and to detect a pulse from the face video. In Embodiment 2, a biological-information detecting device using one camera for measurements will be described. The sections of the biological-information detecting device of Embodiment 2 include the same functions as those of the sections with the same reference signs in Embodiment 1 illustrated in FIGS. 1 to 9, FIGS. 11A to 13, FIG. 16, and the like except for differences described below. Descriptions of these sections are omitted.

Figure 14:
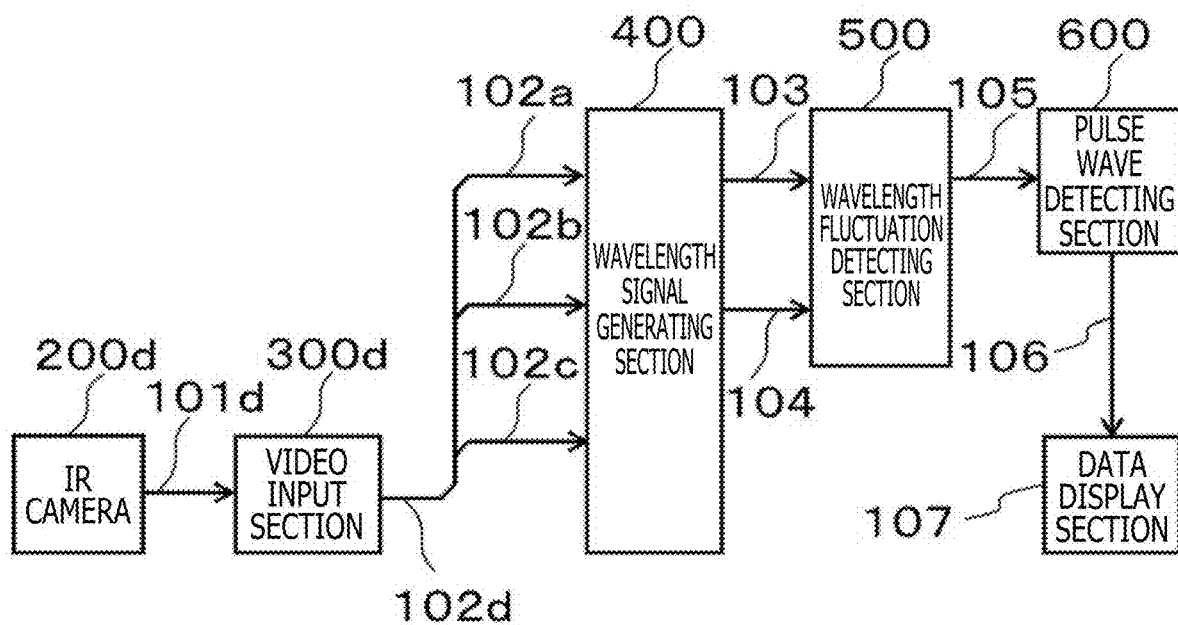
FIG. 14 is a block diagram illustrating an example of a configuration of the biological-information detecting device according to Embodiment 2.

FIG. 14 is a block diagram illustrating an example of a configuration of the biological-information detecting device according to Embodiment 2.

The biological-information detecting device according to the present embodiment includes an IR camera 200d, a video input section 300d, the wavelength signal generating section 400, the wavelength fluctuation detecting section 500, the pulse wave detecting section 600, and the data display section 107.

The IR camera 200d detects each of the three infrared components, and synthesizes the three components into a pack signal, that is, an IR imaging data signal 101d. The IR camera 200d outputs the IR imaging data signal 101d. The video input section 300d receives the IR imaging data signal 101d as an input signal and decomposes a delayed IR data signal 102d into components. The video input section 300d outputs resultant unpack signals, that is, the delayed IR data signals 102a, 102b, and 102c.

The wavelength signal generating section 400 receives the delayed IR data signals 102a, 102b, and 102c as input signals and outputs the wavelength data signal 103 and the level signal 104. The wavelength fluctuation detecting section 500 receives the wavelength data signal 103 and the level signal 104 as input signals, and outputs the average wavelength difference data signal 105. The pulse wave detecting section 600 receives the average wavelength difference data signal 105 as an input signal, and outputs the pulse signal 106. The data display section 107 receives the pulse signal 106 as an input signal, and displays data. Note that, in the present configuration, the wavelength signal generating section 400 may be replaced with the wavelength signal generating section 450.

Figure 15:
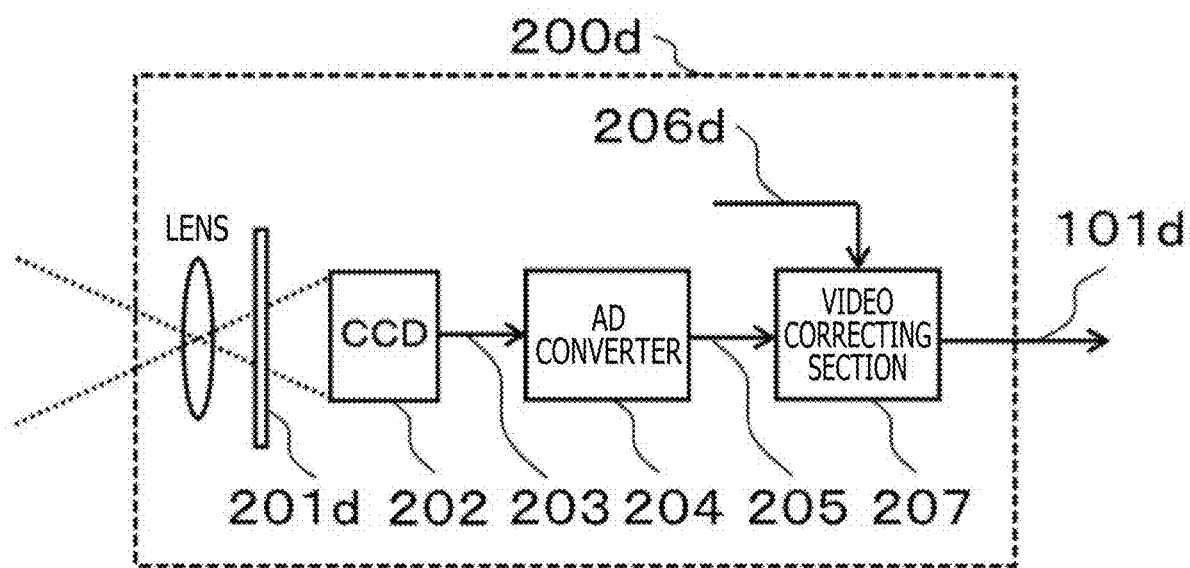
FIG. 15 is a diagram illustrating an example of an IR camera module of the biological-information detecting device according to Embodiment 2.

FIG. 15 is a diagram illustrating an example of an IR camera module of the biological-information detecting device according to Embodiment 2.

In the IR camera 200d, light having passed through the lens travels through an IR transmitting filter (band-pass filter or low pass filter) 201d for three infrared wavelength bands. Infrared light with three wavelengths is radiated to the CCD 202. The light is photoelectrically converted into the electric signal 203, which is then digitized by the AD converter 204. The digital data signal 205 output from the AD converter 204 is input to the video correcting section 207. The video correcting section 207 performs, on the input digital data signal 205, video adjustment such as white balancing and contrasting based on a video adjustment parameter 206d, and outputs, for example, an IR imaging data signal 101d with an IR wavelength for each pixel as a component.

Figure 10A:
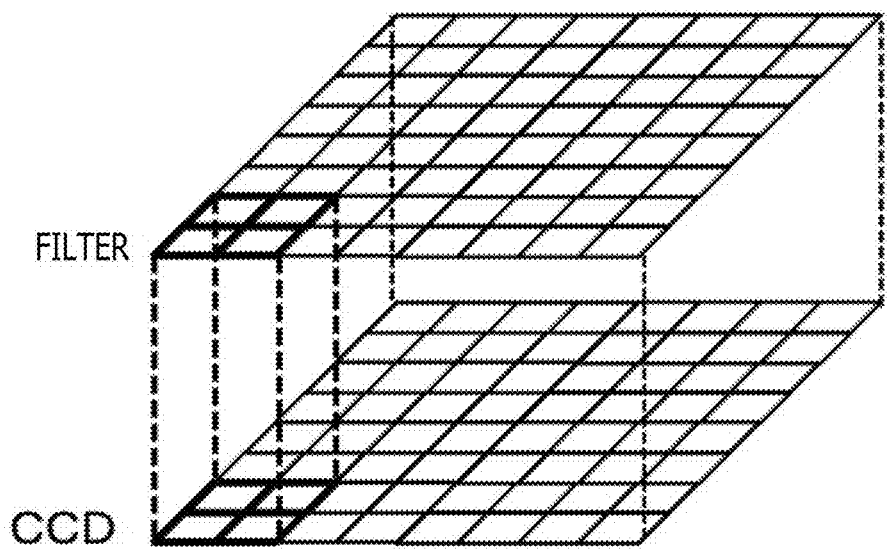
FIG. 10A is a diagram illustrating an example of a band-pass filter of a CCD camera.

FIG. 10A is a diagram illustrating an example of the band-pass filter of the CCD camera.

As illustrated in FIG. 10A, the band-pass filter includes, for example, a color filter located above a CCD so as to overlap the CCD. Additionally, light receiving elements are provided on the CCD, and one light receiving element corresponds to one cell of the color (RGB) filter, corresponding to a pixel.

Figure 10B:
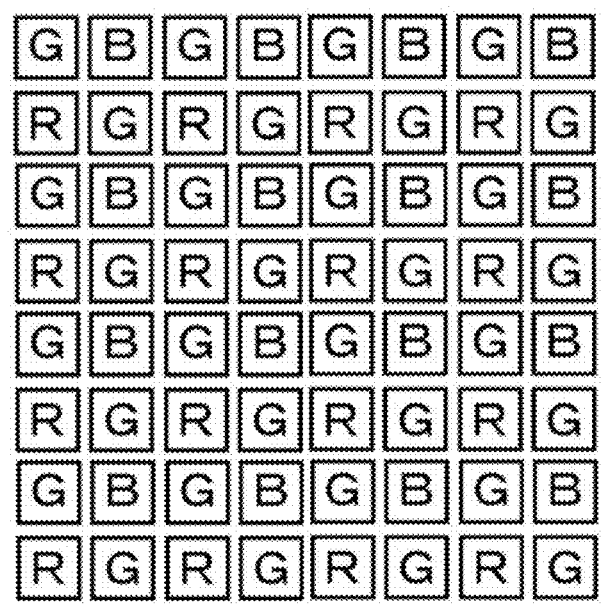
FIG. 10B is a diagram illustrating an example of an RGB filter of the CCD camera.

FIG. 10B is a diagram illustrating an example of the RGB filter of the CCD camera.

One cell of the RGB filter is assigned with one color (that is, one of the R, G, and B), and the cells to which the respective colors are assigned are arranged in an array as illustrated in FIG. 10B. This is referred to as a Bayer arrangement. Two other color components absent from one pixel are obtained by interpolating adjacent peripheral colors.

Figure 10C:
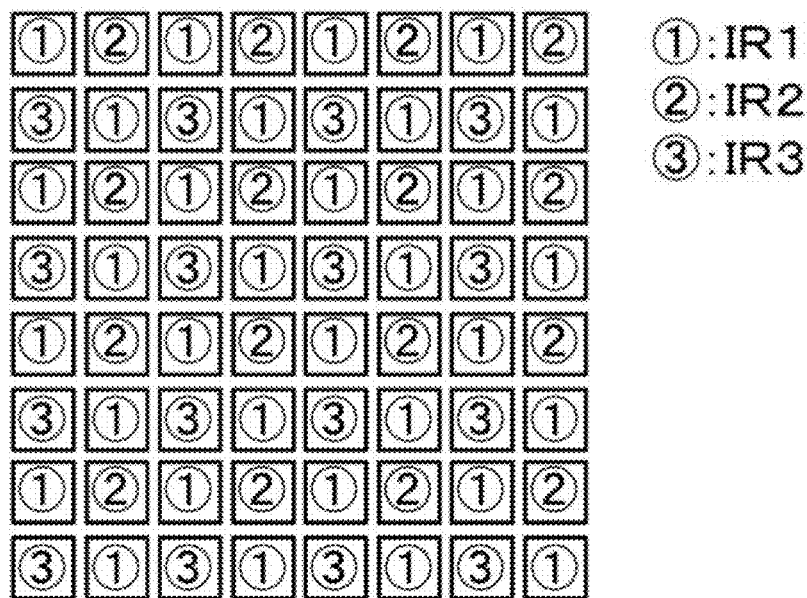
FIG. 10C is a diagram illustrating an example of an infrared filter of an optical system in a biological-information detecting device according to Embodiment 2.

FIG. 10C is a diagram illustrating an example of an infrared filter of an optical system in the biological-information detecting device according to Embodiment 2.

The infrared filter illustrated in FIG. 10C corresponds to the IR1 transmitting filters, the IR2 transmitting filters, and the IR3 transmitting filters replacing the transmitting filters of the RGB filter in FIG. 10B, and represents the IR transmitting filter 201d in FIG. 15.

The configuration of Embodiment 1 eliminates the need for signal interpolation, but instead requires three cameras. In contrast, by using one camera, the configuration of Embodiment 2 enables monitoring that suppresses the negative effect of noise in a non-contact manner and that detects, even during night-time, a sudden change in condition due to a disease, a heart failure, or the like.

Note that the present invention is not limited to the above-described embodiments and includes various modified examples. For example, the above-described embodiments have been described in detail for better understanding of the present invention and are not limited to the embodiments including all of the described components. A part of the configuration of one embodiment can be replaced with the configuration of another embodiment, and the configuration of one embodiment can be added to the configuration of another embodiment. A configuration can be added to, removed from, or replace a part of the configuration of each embodiment.

A part or all of each of the above-described configurations, functions, processing sections, processing means, and the like may be implemented in hardware by, for example, being designed in an integrated circuit. Each of the above-described configurations, functions, and the like may be implemented in software by a processor interpreting and executing programs realizing the respective functions. Information such as programs, tables, and files used to implement the functions can be stored in a storage device such as a nonvolatile semiconductor memory, a hard disk drive, or a solid state drive (SSD), or a computer readable non-transitory data storage medium such as an integrated circuit (IC) card, a secure digital (SD) card, or a digital versatile disc (DVD).

Control lines and information lines illustrated are considered to be necessary for description, and not all of the control lines and information lines for products are illustrated. In actuality, substantially all components may be considered to be connected together.

What is claimed is:

1. A biological-information detection device comprising:
   a video input section accepting video signals including three wavelength components in an infrared region, which are included in reflected light from an object;
   a wavelength detecting section acquiring a wavelength and an intensity of the reflected light from the video signals;
   a face feature amount detecting section detecting a plurality of feature points of a face on a basis of the video signals;
   a measurement target area identifying section identifying a measurement target area on a basis of the plurality of feature points of the face detected;
   a wavelength fluctuation detecting section includes:
   a wavelength data storage section that stores a wavelength of reflected light from the measurement target area at a first time and outputs a delayed wavelength of reflected light at a second time which is delayed from the first time, and
   a wavelength difference calculating section that detects a difference between the wavelength of reflected light from the measurement target area at the first time and the delayed wavelength of reflected light at the second time; and
   a pulse wave detecting section detecting, as a pulse wave, a change in the detected difference.

2. The biological-information detecting device according to claim 1, wherein
   the face feature amount detecting section detects eyes and a mouth as the plurality of feature points of the face, and
   the measurement target area identifying section estimates a skin area on a basis of offsets from the plurality of feature points, and identifies the estimated skin area as the measurement target area.

3. The biological-information detecting device according to claim 1, wherein
   the face feature amount detecting section detects positions and sizes of the plurality of feature points on a basis of the video signals with the three wavelength components, and
   the measurement target area identifying section identifies the measurement target area on a basis of average values or intermediate values of the positions and sizes of the feature points detected on the basis of the video signals with the three wavelength components.

4. The biological-information detecting device according to claim 3, wherein
   in a case where the measurement target area identifying section fails to detect at least one of the positions and sizes of the plurality of feature points on the basis of one of the video signals with the three wavelength components, the measurement target area identifying section identifies the measurement target area on a basis of average values or intermediate values of the positions and sizes of the feature points detected on a basis of the video signals with the remainder of the three wavelength components.

5. The biological-information detecting device according to claim 1, wherein
   the wavelength detecting section acquires wavelengths and intensities in a color space in which the three wavelengths in the infrared region are replaced with red, green, and blue in a visible light region.

6. The biological-information detecting device according to claim 5, wherein
   the color space is a hue-saturation-value space or a hue-saturation-lightness space.

7. The biological-information detecting device according to claim 5, wherein
   after identifying the measurement target area on the basis of the plurality of feature points of the face, the measurement target area identifying section identifies a partial space included in the color space and including values of at least some of pixels in the identified measurement target area, and
   identifies an area of the pixels in the partial space as the measurement target area.

8. The biological-information detecting device according to claim 1, further comprising:

three infrared cameras including infrared transmitting filters with different spectral characteristics, wherein the video input section accepts, from the three infrared cameras, video signals including the three wavelength components.

9. The biological-information detecting device according to claim 1, further comprising:

an infrared camera including a light receiving section provided with one of three types of infrared transmitting filters with different spectral characteristics, wherein the video input section accepts, from the infrared camera, video signals including the three wavelength components.

10. A biological-information detection method executed by a biological-information detecting device, comprising:

accepting video signals including three wavelength components in an infrared region, which are included in reflected light from an object;

acquiring a wavelength and an intensity of the reflected light from the video signals;

detecting a plurality of feature points of a face on a basis of the video signals;

identifying a measurement target area on a basis of the plurality of feature points of the face detected;

storing a wavelength of reflected light from the measurement target area at a first time and outputting a delayed wavelength of reflected light at a second time which is delayed from the first time;

detecting a difference between a wavelength of reflected light from the measurement target area at the first time and a wavelength of reflected light at the second time; and detecting, as a pulse wave, a change in the detected difference.

* * * * *